Patented Mar. 10, 1942

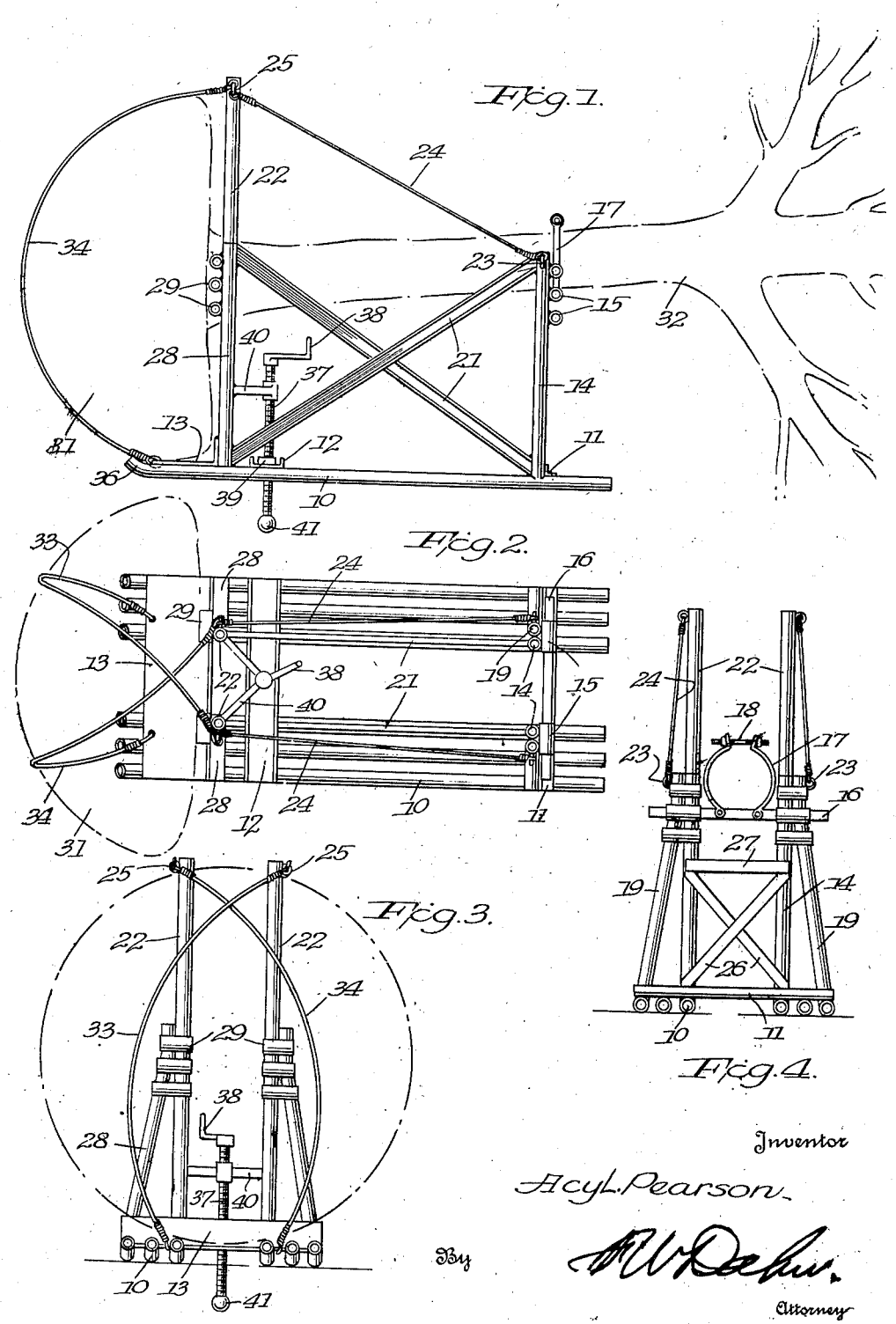

2,275,552

UNITED STATES PATENT OFFICE 2,275,552

TREE TRANSPLANTING DEVICE

Acy L. Pearson, Memphis, Tenn.

Application January 17, 1939, Serial No. 251,410

11 Claims. (Cl. 214—3)

My invention relates to a tree transplanting device and it is an object of the same to provide a simple and durable mechanism which can be taken to a tree in places where trucks and the like cannot go, which will be of assistance in uprooting the tree, which can then be transported by any convenient means, such as a truck or a trailer, a mud boat or the like, and which can thereafter be unloaded from such transporting device and can readily be moved into almost any location where a tree is to be planted.

Another object of the device is to provide means for supporting the same in such a way that it can easily be turned, together with its load, about a vertical axis, so as to be convenient for loading or unloading and so as to face toward a hole in which the ball of roots and earth on the tree is to be positioned.

Another object of the device is to provide simple and effective means for supporting a ball of earth attached to a tree, which means also serves to aid in uprooting or separating the tree from the ground underneath, in such manner that it is not necessary to separate the ball completely from the earth, but it is only necessary to dig a trench about the same and approximately to the level of the bottom of the ball which is to be formed.

Another object of the device is to provide readily adjustable means on the frame or cradle, whereby a tree may be supported at a level suited to the diameter of the ball.

Another object is to provide means near the center of gravity of the cradle and its load whereby the device can readily be tilted so as to raise or lower the top of the tree for convenience in transportation.

Referring to the drawing, which is made a part of this application and in which similar reference characters indicate similar parts:

Fig. 1 is a side elevation of my device with a tree thereon,

Fig. 2, a plan with parts omitted,

Fig. 3, an end elevation looking from the left in Fig. 1, and

Fig. 4, an end elevation with the tree omitted, looking from the right in Fig. 1.

In the drawing, reference character 10 indicates the bottom portions of the device, said parts being here shown as comprising a series of parallel tubes which form a substantially flat bottom for the device, but it will be understood that any suitable floor means may be substituted for the tubes which are illustrated. The tubes are connected by cross members 11, 12 and 13. Uprights 14, secured to tubes 10 at their lower ends are provided adjacent their upper ends with a plurality of tubular sockets 15 for receiving and supporting a cross bar 16, said cross bar supporting a pair of clamps 17 pivotally mounted on said cross bar and adapted to be connected at their upper ends by a bolt 18. By means of the sockets 15 the cross bar 16 may be held at different elevations as desired.

Braces 19 for the uprights 14 are affixed to the outer tubes of the floor and are secured at their upper ends to the upright 14 as by means of welding. Cross braces 21 connect the upper and lower ends of uprights 14, respectively, to the lower ends of uprights 22 at the other end of the frame and to an intermediate point on said uprights 22. It will be noted that the uprights 22 at the rear end of the frame extend higher than uprights 14, and preferably to a height equal to the diameter of the largest ball which is to be transported in a transplanting operation. At the outer side of braces 19 there are provided eyes 23, which are connected by means of wires 24 to similar eyes 25 at the upper ends of uprights 22 for additionally bracing the frame. The uprights 14 are further braced by means of cross braces 26 and a strap 27, and similar devices may be employed in connection with the rear uprights 22.

The rear uprights are also braced by inclined tubular members 28 in similar manner to the members 19 and are provided with eyes 29 for adjustably supporting a bar which may be solid or hollow, according to convenience or desire, and which carries clamping means.

The cross member 13 is of suitable width to provide a shelf for engaging and supporting the lower edge of a ball attached to a tree, such a ball being indicated at 31 as attached to a tree 32, and the cross member is here shown as engaging and supporting uprights 22 and braces 28. Supporting bands 33 and 34, which may be of any suitable number and shape, are here shown as attached at their lower ends to the rear portion of the shelf 13 and at their upper ends to eyes 25 at the upper ends of uprights 22. These bands may consist of wires or metal straps or cables, etc., and should be preferably of a width suitable for lifting the ball without cutting into it. It is my intention to cut a trench about a tree to a depth corresponding approximately to the intended thickness of the ball and to undercut the desired ball to some extent, after which the bands 33, 34 are passed underneath the sides of the intended ball in crossing relation (the frame being at this time turned into an upright position with the uprights 22 resting on the surface of the earth and with the rear end of the floor members 10 extending down into the trench). When now force is exerted on the front end of the frame, after securing the clamp 17 about the bole or trunk of the tree, it will be seen that the floor members and other parts of the cradle act as a simple and powerful lever to separate the ball from the earth underneath it, and that it is unnecessary to dig completely underneath the ball to separate it from the soil, but that a large part of the ball may still be attached to the earth and will be separated therefrom by the lever action of the device.

To aid in such action the floor members 10 are extended rearwardly to a suitable extent and are preferably curved upward as indicated at 36. Ordinarily the bands 34 will be connected to the shelf 13 permanently and in a pivotal manner and suitable means will be provided for attaching them temporarily to the eyes 25, but the contrary or other arrangements may be made if desired.

The cross member 12, which is secured to the floor members, provides a support for a screw 37 having a handle 38 and mounted in a nut 39 suitably secured to the part 12. The screw is supported at its upper end by an eye at the meeting end of a pair of bars 40 (or an integral angular member) secured to uprights 22 for guiding the screw and is provided at its lower end with a ball 41. In the normal position of the screw the ball is withdrawn to a position above the bottom of the floor members so as not to interfere with movement of the same in loading or unloading, or in skidding it over the ground on rollers, etc. When it is desired to change the position of the tree and the frame by this means the screw is turned to move the ball just sufficiently below the floor members so that the whole device may be turned about the screw as a vertical axis into the desired position.

This screw also provides means for elevating the top of the tree suitably, since it is located near the rear of the cradle and generally approximately below the center of gravity of the cradle and its load. Therefore, when the screw is turned downward, the entire device will tilt horizontally about the ball 41 as a fulcrum, the ball end of the tree remaining down and the other end being elevated.

Since the device is simple and self-contained, in the sense that it is an independent unit that can be handled as such, and is not a part of any wagon, truck, trailer or the like, it is peculiarly well suited for use in transplanting trees, which must often be brought out of rather inaccessible places, such as a clump of trees in a swamp, then hauled for long distances by truck and/or flat car, and then again taken to and planted in a place not easily accessible, such as commonly found about a dwelling, where the arrangement of buildings, or of other trees, etc., would prevent access of a truck or wagon, but my cradle can readily be skidded into place by the use of rollers or a mudboat or other like expedient. The bands or cables 33, 34 can of course be wrapped about uprights 22 at suitable heights when smaller balls are to be transplanted.

One of the important advantages of my device is that the self-contained unit can be used as a lever to separate a ball from the ground underneath, and to which it is still united in large part, by action about a fulcrum very close to the intended line of separation, whereby an important advantage in leverage is had as compared with such separable wagon portions as have long been in use, wherein a part of a wagon body supported on two wheels is used as a lever, the axis of the wheels forming a fulcrum far removed from the weight to be lifted.

It will be understood that the lifting jack may be removably secured to the cradle and that lifting jacks of other types may be substituted for the screw jack shown. It will also be obvious that many other alterations may be made in my invention, all without departing from the spirit of the invention; therefore I do not limit myself to what is herein shown and described, but only as indicated by the appended claims.

Having thus fully described my invention what I claim is:

1. In a device for transplanting trees, a skiddable cradle having a substantially flat bottom portion, means spaced lengthwise of said cradle for supporting a tree in prone position, and adjustable prop means on said cradle adjacent the ball of a tree carried thereby adapted to be caused to engage the ground and to react therewith for lifting the cradle and supporting it for rotation about a vertical axis, substantially as set forth.

2. In a device for use in transplanting trees, a skiddable cradle having a substantially flat bottom portion, means spaced lengthwise of said cradle for supporting a tree in prone position, and a vertically adjustable screw on the cradle, said screw having a rounded lower end adapted to be projected below the bottom of the cradle into engagement with the ground so as to coact therewith for raising the cradle to permit it to be rotated about said screw as an axis, substantially as set forth.

3. In a device for use in transplanting trees, a skiddable frame having a substantially flat bottom, a pair of uprights adjacent each end thereof, one of said pairs being approximately as tall as the diameter of the largest tree ball to be transplanted, tree trunk supporting bars, means on said uprights for supporting said bars at various levels, supporting bands attached to the lower part of said frame, and means at the upper ends of said last-named pair of uprights for attachment of the free ends of said bands, substantially as set forth.

4. In a device for use in transplanting trees, a frame having a bottom portion, means adjacent one end of the bottom for supporting the ball of a tree, a pair of laterally spaced uprights at either side of the frame, a plurality of bands each arranged to be connected to the bottom of the frame at one side of said ball and to an upright at the other side thereof, and means adapted to be placed on each pair of the uprights for supporting the trunk of the tree, substantially as set forth.

5. In a device for use in transplanting trees, a frame having a bottom portion, a pair of uprights adjacent each end thereof, one of said pairs being approximately as tall as the diameter of the largest tree ball to be transplanted, a shelf on said bottom portion between said last-named uprights and the end of the frame for supporting the lower margin of a tree ball, and bands arranged to be attached to said shelf and to the adjacent uprights, the length of said bands being such that their intermediate portions will embrace said ball.

6. In a device for use in transplanting trees, a skiddable frame comprising a substantially flat ground engaging floor and a curved fulcrum portion at one end thereof, prop means on said frame for supporting a tree in prone position, and means on the frame adjacent the ball end of a tree so supported for tilting the frame, said means being adapted to be forced against the ground and to react therewith to raise the end of the frame which is remote from said ball end of the tree, substantially as set forth.

7. In a device for use in transplanting trees, a skiddable cradle having a substantially flat bottom, pairs of uprights adjacent opposite ends of the cradle, the uprights of each pair being spaced apart, means on one pair for supporting the trunk of a tree, and means arranged to encircle the ball of such a tree and to be connected to opposite ends of the other pair of uprights.

8. A tree transplanting device comprising a skiddable floor portion of elongated parallel substantially straight rod-like members, said members being bent upward at one end, spaced bole-engaging means on said floor portion, and a shelf between said bole-engaging means and the upwardly bent ends of said rod-like members.

9. In a device for use in transplanting trees, a frame having a bottom portion, a pair of uprights adjacent each end thereof, one of said pairs being approximately as tall as the diameter of the largest tree ball to be transplanted, a shelf on said bottom portion between said last-named uprights and the end of the frame for supporting the lower margin of a tree ball, bands each adapted to be attached to the bottom portion of the frame adjacent a corner thereof and to extend about the ball to the upper end of an upright at the other corner at the same end of the frame, braces at the sides of the frame connecting the uprights at that side, and a cable connecting the upper ends of each pair of front and rear uprights connected by said braces.

10. In a device for transplanting a tree with a ball of earth on its roots, a skiddable cradle having a substantially flat bottom, pairs of spaced-apart uprights located respectively adjacent the front and rear ends of the cradle, means on the front pair of uprights for supporting the trunk of a tree at a point remote from said ball, means on the rear pair of uprights for supporting the trunk of the tree close to said ball, and means adapted to be trained about said ball and to be connected to the rear pair of uprights for holding the tree in place on the cradle.

11. A device as in claim 10, the supporting means on each pair of uprights being adjustable so as to vary the distance between the tree and the bottom of the cradle.

ACY L. PEARSON.